UNITED STATES PATENT OFFICE.

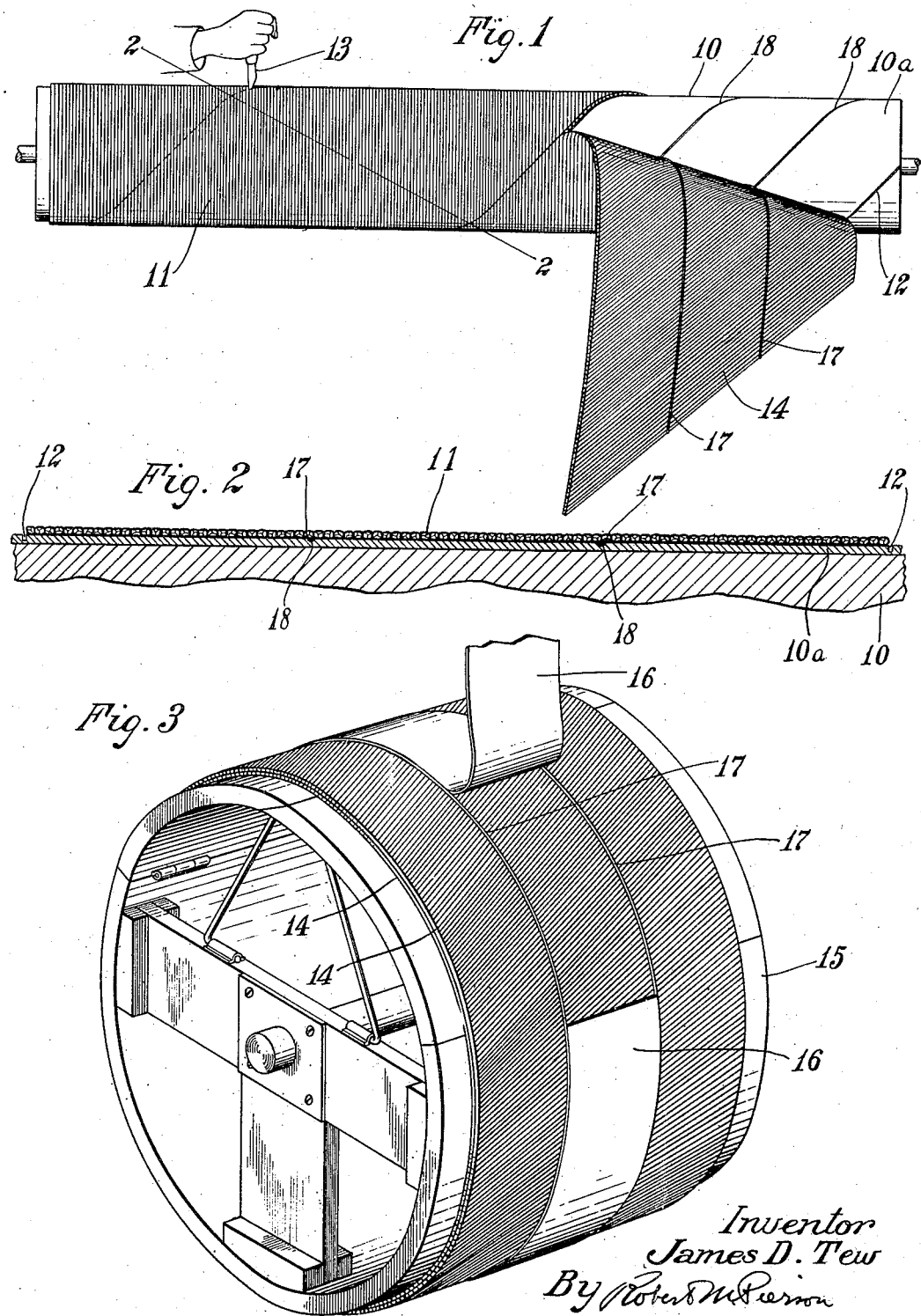

JAMES D. TEW, OF AKRON, OHIO, ASSIGNOR TO THE B. F. GOODRICH COMPANY, OF NEW YORK, N. Y., A CORPORATION OF NEW YORK.

LAMINATING METHOD AND ARTICLE.

1,287,515.   Specification of Letters Patent.   Patented Dec. 10, 1918.

Application filed July 13, 1918. Serial No. 244,810.

*To all whom it may concern:*

Be it known that I, JAMES D. TEW, a citizen of the United States, residing at Akron, in the county of Summit and State of Ohio, have invented a certain new and useful Laminating Method and Article, of which the following is a specification.

This invention relates to the art of making pneumatic-tire carcasses or other laminated rubberized fabric structures, and its object is to provide one or more of the rubberized cord or other fabric plies with a suitable marking by which a superposed strip or strips of rubber or other material may be accurately located in the middle of said ply or in any other predetermined position thereon, the process being preferably such that said marking is automatically formed on the surface of the ply in the course of manufacture of the latter.

Of the accompanying drawings,

Figure 1 is a side elevation showing the mode of forming and marking a rubberized cord strip or band in accordance with my invention.

Fig. 2 is a flattened or developed section on the line 2—2 of Fig. 1.

Fig. 3 is a perspective view showing the application of a rubber strip between the marking ridges on the outer one of a pair of cord plies.

In the drawings, 10 is an elongated cylindrical drum or mandrel adapted to be placed in a lathe and to have wound thereon a cylinder of cord 11 which is faced, covered or coated with vulcanizable rubber compound in any suitable manner, either in the form of rubber facing sheets or rubber solution applied to the drum and to the cord cylinder, or as a covering or sheath upon each strand, applied before the cord is wound upon the drum, the last-mentioned method being preferred. The surface of the drum is formed by a sheet 10ª of zinc or other suitable metal in which is cut a steep-pitched helical groove 12, preferably crossing the cords at an angle of 45° and adapted to guide the point of a knife 13 which is used to slit the cord cylinder, as indicated in Fig. 1. The resulting wide strip or band 14 is then peeled off and ready to be incorporated in a pneumatic tire carcass or other structure. In Fig. 3, two such strips or tire-forming plies (which would have their cords slanted in opposite directions) are shown laid together in the form of an endless flat band upon a collapsible drum 15, the strips being separately laid, one upon the other, and each having its ends butted together. This view illustrates a step in a certain mode of tire building according to which a laminated, endless cord band is built up of two or more plies or pairs of plies of crossed cords and afterward formed into tire shape by the use of an expansible air bag or core, or by stretching the annular band over a ring mandrel having the form of the inside of a completed tire, and then smoothing or stitching down the sides of the plies. In the last-mentioned procedure, it is desirable to have the ply or plies, whose margins are to lie respectively inside and outside of the bead cores, stuck together along their middle zone and free at their margins for the insertion of said bead cores. To this end, and also for the purpose of providing cushion rubber between the plies, a thin strip of unvulcanized rubber compound 16 is applied to the middle of the first-laid pair of plies as shown in Fig. 3. The specific purpose of my invention in this connection is to provide one or more positioning marks for the strip 16, without requiring a separate operation such as marking with a pointed instrument and a ruler while the cord strip is extended flat.

Accordingly I integrally mold or emboss upon that face of the cord band 14 to which the rubber strip 16 is to be applied, a pair of rubber ridges 17 parallel to the side edges of the cord strip and spaced apart a distance equal to the width of the rubber strip 16. The formation of these ridges is effected by cutting two shallow grooves 18 in the outer surface of the metal drum cover 10ª, between and parallel to the turns of the knife-guiding groove 12. The plastic rubber which covers the cords 11 enters these grooves 18 when the cord is wound upon the drum, so as to mold the ridges upon the inner surface of the cord sheet, the said ridges retaining their form when the strip 14 is peeled from the drum. These ridges may be formed upon all of the plies in the tire carcass, and are utilized on that ply or plies upon which the rubber strip 16 is placed, although it would obviously be possible to use them or a similar set of ridges as visual guides for positioning any other lamination, such as the breaker, tread or rubber side strips which are superposed upon the carcass. The strip 16 is progressively wrapped upon the endless cord band, with its edges coincident with the ridges 17 as indicated in Fig. 3. This pair of plies may then be removed from the collapsible drum 15, stretched over the tire-forming core, stitched down thereon, and a second pair of plies stretched over the core and stitched down, or the complete carcass could be laid up on the drum 15 and then formed into tire shape.

I claim:

1. A strip of fabric for making laminated structures, said strip having a raw rubber surface formed with a raised marking intermediate its side edges as a guide for positioning a superposed strip or lamination.

2. A strip of fabric for making laminated structures, said strip having a surface of raw rubber on which are integrally formed, between and parallel with the edges of the strip, two longitudinally-extending ridges of rubber adapted to act as positioning marks for a superposed strip or lamination.

3. In the building of laminated tire carcasses, the method which consists in laying a rubberized fabric strip upon a suitable support adapted to act as a mold, forming a positioning mark in the raw rubber surface by the molding action of said support, and superposing a strip of material upon said rubberized fabric strip, with its edge adjacent to said positioning mark.

4. In the building of laminated structures, the method which consists in winding a cylinder of rubberized cord upon a drum having a helical knife-guiding groove and a parallel molding groove, molding a ridge on the inner surface of the cord cylinder by means of said molding groove, slitting the cord cylinder along the line of said knife-guiding groove to form a cord strip, peeling said strip from the drum, butting the ends of said strip to form an annular band of diagonally-extending cords with the ridged face outermost, and overlaying said annular band with a raw rubber strip having one edge adjacent to said ridge.

In testimony whereof I have hereunto set my hand this 11 day of July, 1918.

JAMES D. TEW.